United States Patent
Stuart et al.

(10) Patent No.: US 7,684,698 B2
(45) Date of Patent: Mar. 23, 2010

(54) METHODS AND SYSTEMS FOR CONTROLLING POWER IN A COMMUNICATIONS NETWORK

(75) Inventors: Steve Stuart, Eden Prairie, MN (US); Paul Schatz, Burnsville, MN (US); Ana Santos, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 751 days.

(21) Appl. No.: 11/349,827

(22) Filed: Feb. 8, 2006

(65) Prior Publication Data

US 2007/0183776 A1 Aug. 9, 2007

(51) Int. Cl.
*H04B 10/08* (2006.01)
*H04B 10/06* (2006.01)

(52) U.S. Cl. .............................. 398/27; 398/25; 398/33; 398/38; 398/202; 398/212; 398/213

(58) Field of Classification Search ................... 398/25, 398/27, 33, 38, 202, 212, 213
See application file for complete search history.

(56) References Cited

U.S. PATENT DOCUMENTS

| 5,019,769 | A | | 5/1991 | Levinson |
| 5,923,450 | A | | 7/1999 | Dugan et al. |
| 6,061,171 | A | * | 5/2000 | Taylor et al. ............. 359/337.1 |
| 6,567,762 | B2 | * | 5/2003 | Bourde et al. ................ 702/107 |
| 6,600,594 | B1 | | 7/2003 | Ko et al. |
| 6,941,079 | B1 | | 9/2005 | Barozzi |
| 7,343,102 | B2 | | 3/2008 | Tomofuji |
| 2001/0019102 | A1 | * | 9/2001 | Chikuma ................. 250/214 R |
| 2003/0081301 | A1 | | 5/2003 | Fujii et al. |
| 2004/0062557 | A1 | | 4/2004 | Takashima et al. |
| 2004/0081421 | A1 | | 4/2004 | Mori et al. |
| 2004/0109661 | A1 | | 6/2004 | Bierman |
| 2005/0019032 | A1 | | 1/2005 | Scarth et al. |
| 2007/0071451 | A1 | * | 3/2007 | Schatz et al. ................. 398/162 |

FOREIGN PATENT DOCUMENTS

| EP | 0502386 | 9/1992 |
| JP | 2000049712 | 2/2000 |
| WO | 2004051891 | 6/2004 |

* cited by examiner

*Primary Examiner*—Ken N Vanderpuye
*Assistant Examiner*—Daniel G Dobson
(74) *Attorney, Agent, or Firm*—Fogg & Powers LLC (57) ABSTRACT

Methods and systems for controlling power in a communications network are provided. In one embodiment, a method comprises reading a power level of a communication link; and, driving an attenuation control signal based on the power level of the communication link. When the power level is greater than or equal to a minimum supported power level, driving an attenuation control signal further comprises constraining the attenuation control signal to a calibrated range of a characteristic curve. When one or both of the power level is less than the minimum supported power level and a bit error rate is greater than a maximum error threshold, driving an attenuation control signal further comprises generating an attenuation control signal outside the calibrated range of the characteristic curve.

22 Claims, 3 Drawing Sheets

METHODS AND SYSTEMS FOR CONTROLLING POWER IN A COMMUNICATIONS NETWORK

CROSS REFERENCES TO RELATED APPLICATIONS

This application is related to the following co-pending United States patent applications all of which are hereby incorporated herein by reference:

U.S. patent application Ser. No. 11/238,364 entitled "Systems and Methods for Optical Power Window Control"), filed Sep. 29, 2005, and which is referred to here as the '705 Application; and U.S. patent application Ser. No. 11/238,553 entitled "Methods and Systems for Controlling Optical Power Attenuation"), filed Sep. 29, 2005, and which is referred to here as the '724 Application.

BACKGROUND

One of the major challenges of installing and operating optical data communications systems, such as those often used to communicate data within cellular networks, is maintaining optical power levels within the power windows required for optical receivers to correctly function. One way the communications industry has handled this requirement is by installing fixed inline optical power attenuators in the physical layer of an optical communications system. However, problems arise in this solution because every network facility is different in terms of optical power loss due to equipment and varying fiber optic cable lengths. To implement the fixed optical power attenuator solution, network operators must deploy technicians to manually take optical power measurements at one location while calibrating attenuators at other locations. Besides the high implementation and operational expenses associated with fixed inline attenuators, their presence in the physical layer of a communications network creates additional points for introducing contamination and network failures.

Feedback control variable optical power attenuators have been proposed as one solution for managing optical power. One problem experienced when using feedback controlled variable optical power attenuators is a phenomenon known as "sticking." When sticking occurs, the affected optical power attenuator no longer responds to feedback signals but instead "sticks" at some constant attenuation. When sticking occurs, automated control of optical power is no longer possible as the variable optical power attenuators essentially becomes a fixed inline attenuator. The resulting attenuation may produce optical power levels that are too low to support digital communication. The exact point where sticking occurs varies from one optical power attenuator to another, and drifts for any one optical power attenuator over time or as a function of environmental factors such as temperature.

For the reasons stated above and for other reasons stated below which will become apparent to those skilled in the art upon reading and understanding the specification, there is a need in the art for improved methods and systems for variable optical power attenuator control.

SUMMARY

The Embodiments of the present invention provide methods and systems for optical power window control and will be understood by reading and studying the following specification.

In one embodiment, a method for controlling power in a communications network is provided. The method comprises reading a power level of a communication link; driving an attenuation control signal based on the power level of the communication link; when the power level is greater than or equal to a minimum supported power level, driving an attenuation control signal further comprises constraining the attenuation control signal to a calibrated range of a characteristic curve; and when one or both of the power level is less than the minimum supported power level and a bit error rate is greater than a maximum error threshold, driving an attenuation control signal further comprises generating an attenuation control signal outside the calibrated range of the characteristic curve.

In another embodiment, a computer-readable medium having computer-executable program instructions for a method for controlling power in a communications network. The method comprises reading a power level of a communication link; generating an attenuation control signal based on the power level of the communication link; when the power level is greater than or equal to a minimum supported power level, driving an attenuation control signal further comprises constraining the attenuation control signal to a calibrated range of a characteristic curve; and when one or both of the power level is less than the minimum supported power level and a bit error rate is greater than a maximum error threshold, generating an attenuation control signal further comprises generating an attenuation control signal outside the calibrated range of the characteristic curve.

In still another embodiment, a system for controlling optical power levels is provided. The system comprises an optical receiver that receives a modulated optical light signal, demodulates the modulated optical light signal into one or more communications signals, and outputs the one or more communications signals to a communications network; at least one optical power attenuator that dynamically adjusts the attenuation of the modulated optical light signal based on an attenuation control signal; a controller coupled to the at least one optical power attenuator, wherein the controller is adapted to receive a signal representing the optical power of the modulated optical light signal from the optical receiver and to output the attenuation control signal; wherein when the optical power of the modulated optical light signal is greater than or equal to a minimum supported power level, the controller is adapted to constrain the attenuation control signal to a calibrated range of a characteristic curve; and when one or both of the optical power of the modulated optical light signal is less than the minimum supported power level and a bit error rate is greater than a maximum error threshold, the controller is adapted to generate an attenuation control signal outside the calibrated range of the characteristic curve.

In yet another embodiment, a system for controlling power in a communications network is provided. The system comprises means for measuring a power level of a modulated optical signal; means for generating an attenuation control signal based on the power level of the modulated optical signal, the means for generating an attenuation control signal responsive to the means for measuring the power level of the modulated optical signal; means for constraining the attenuation control signal to a calibrated range of a characteristic curve when the power level is greater than or equal to a minimum supported power level; and wherein, the means for generating an attenuation control signal is further adapted to generate an attenuation control signal outside the calibrated range of the characteristic curve when one or both of the power level is less than the minimum supported power level and a bit error rate is greater than a maximum error threshold.

BRIEF DESCRIPTION OF DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention allow a communications network to more fully exploit automatic attenuation of optical signals while still maintaining adequate optical power to reliably demodulate the optical signals. Embodiments of the present invention provide optical power attenuation control through a feedback controlled optical power attenuation system without sticking. Embodiments of the present invention further provide automated set-up and control of optical power in communication networks, thus reducing installation and long term operating expenses for network operators, and eliminating the need to send technicians to remote locations to perform inline attenuator calibrations.

Figure 1:
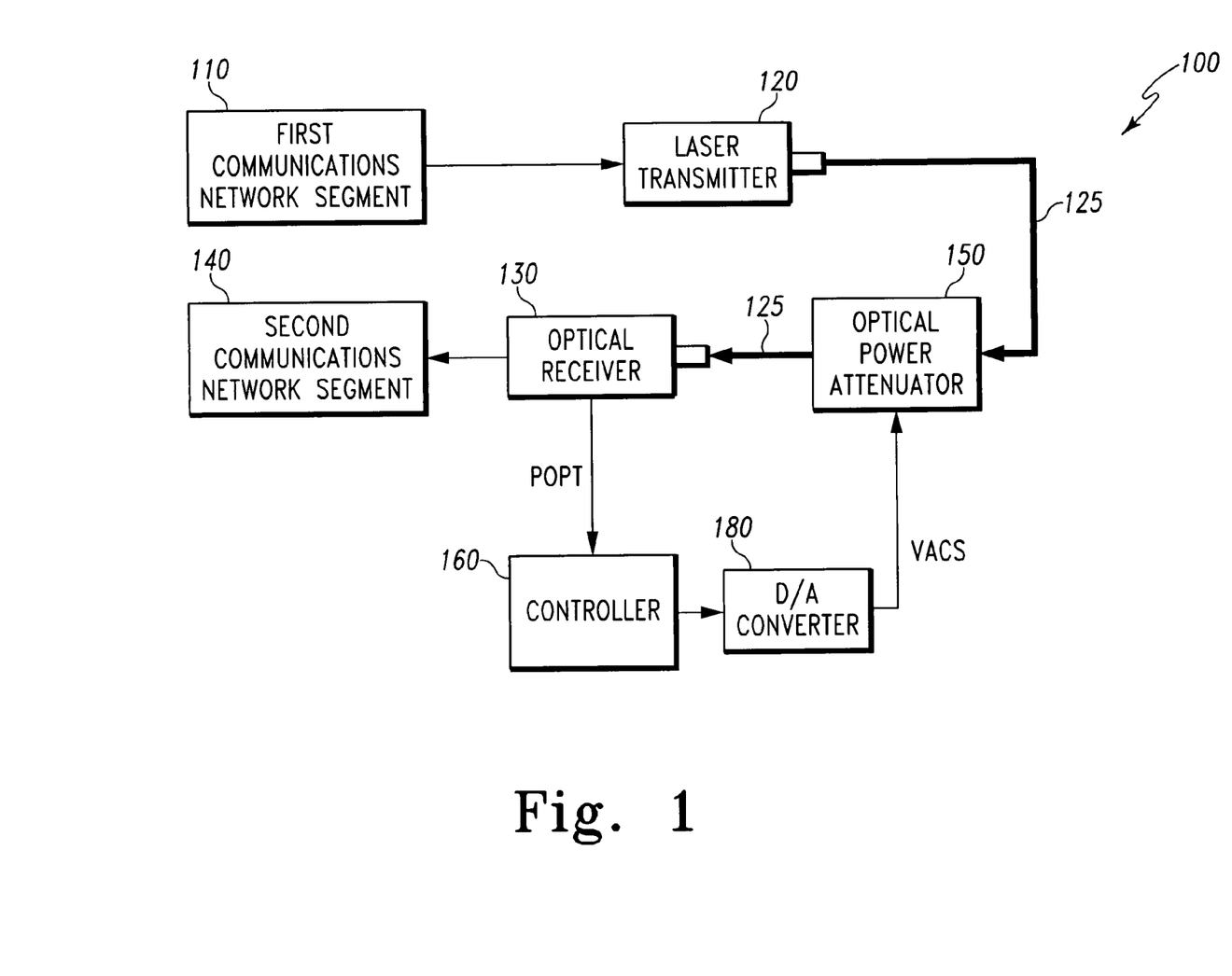
FIG. 1 is a diagram illustrating a communications network having received optical power feedback based attenuation of one embodiment of the present invention.

FIG. 1 illustrates a telecommunications network 100 of one embodiment of the present invention. In the embodiment of FIG. 1, baseband communication signals are transmitted from a first communications network segment 110 to a second communications network segment 140 via a fiber optic link 125. In one implementation, first communications network segment 110 comprises a cellular remote unit that receives wireless radio frequency communications signals and outputs baseband communication signals modulated to a baseband frequency. In another implementation, first communications network segment 110 comprises a cellular base station that receives communications signals from one or more upstream telecommunications networks. In other embodiments, first communications network segment 110 comprises part of a Synchronous optical network (SONET) based network, or other network, for communicating digital information. In alternate implementations, the baseband communication signals are either analog signals or digital signals.

In the embodiment shown in FIG. 1, first communications network segment 110 outputs baseband communication signals to a laser transmitter 120 that modulates laser light based on the baseband communication signals, and transmits the modulated laser light to optical receiver 130 via one or more fiber optic media 125. Optical receiver 130 demodulates the laser light back into a baseband signal and outputs that baseband signal to second communications network segment 140.

In one implementation, second communications network segment 140 comprises a cellular remote unit that receives the baseband communications signals from optical receiver 130, re-modulates the signals to a radio channel, and wirelessly transmits the signals as radio frequency communications signals. In another implementation, second communications network segment 140 comprises a cellular base station that output communications signals received from optical receiver 130 to one or more upstream telecommunications networks. In other embodiments, second communications network segment 140 comprises part of a Synchronous optical network (SONET) based network, or other network, for communicating digital information. In one embodiment, second communications network segment 140 further converts the received baseband communications signals from digital signals into analog signals.

Optical receiver 130 has a very specific range of operation for receiving optical signals, and too much power will damage optical receiver 130. Due to differences in manufacturer's specifications, absent appropriate measures, there is no guarantee that the power of the optical signal launched by laser transmitter 120 will be within the window of operation when the signal reaches optical receiver 130. For example, in one embodiment, laser transmitter 120 launches a modulated optical light signal having an optical power of 0 dBm while optical receiver 130 requires received optical light signals to fall within a window of operation between −11 dBm to −27 dBm. The modulated optical light signal must be attenuated at least 11 dBm to prevent damage to optical receiver 130, but attenuated no more than 27 dBm to ensure that optical receiver can reliably demodulate the signal to recover the baseband communications signals without increasing the bit error rate.

To regulate the power of optical signals, network 100 includes a feedback system in the form of a feedback controlled variable optical power attenuator 150, coupled between laser transmitter 120 and optical receiver 130, and a controller 160 coupled to optical receiver 130 and optical power attenuator 150. Controller 160 is programmed to maintain the optical power level of the signal received by optical receiver 130 within the window of operation for optical receiver 130 by providing feedback to variable optical power attenuator 150 in the form of an attenuation control signal. In one embodiment, the attenuation control signal output from controller 160 is a digital signal converted into a voltage signal (Vacs) by digital to analog (D/A) converter 180 for input by optical power attenuator 150.

In one embodiment, in operation, optical receiver 130 measures the optical power level of the optical signal it receives and outputs a signal representing the optical power level. Controller 160 receives the optical power level signal from optical receiver 130. Based on the optical power level of the optical signal, controller 160 generates the attenuation control signal. In one embodiment, controller 160 adjusts the attenuation control signal in order to maintain the optical power of the signal received by optical receiver 130 at a pre-defined target power level. For example, in one embodiment where the window of operation for optical receiver 130 is defined by a maximum supported power level of −11 dBm, and a minimum supported power level of −27 dBm, the pre-defined target power level is −17 dBm. In one embodiment, controller 160 is programmed to maintain the optical power of the signal received by optical receiver 130 within a target power range (such as a range of −16.5 dBm to −17.5 dBm, for example). In such an embodiment, when the optical power of the signal received by optical receiver 130 does not fall within the target power range, controller 160 adjusts the attenuation control signal to bring the optical power back within the target power range.

Figure 2:
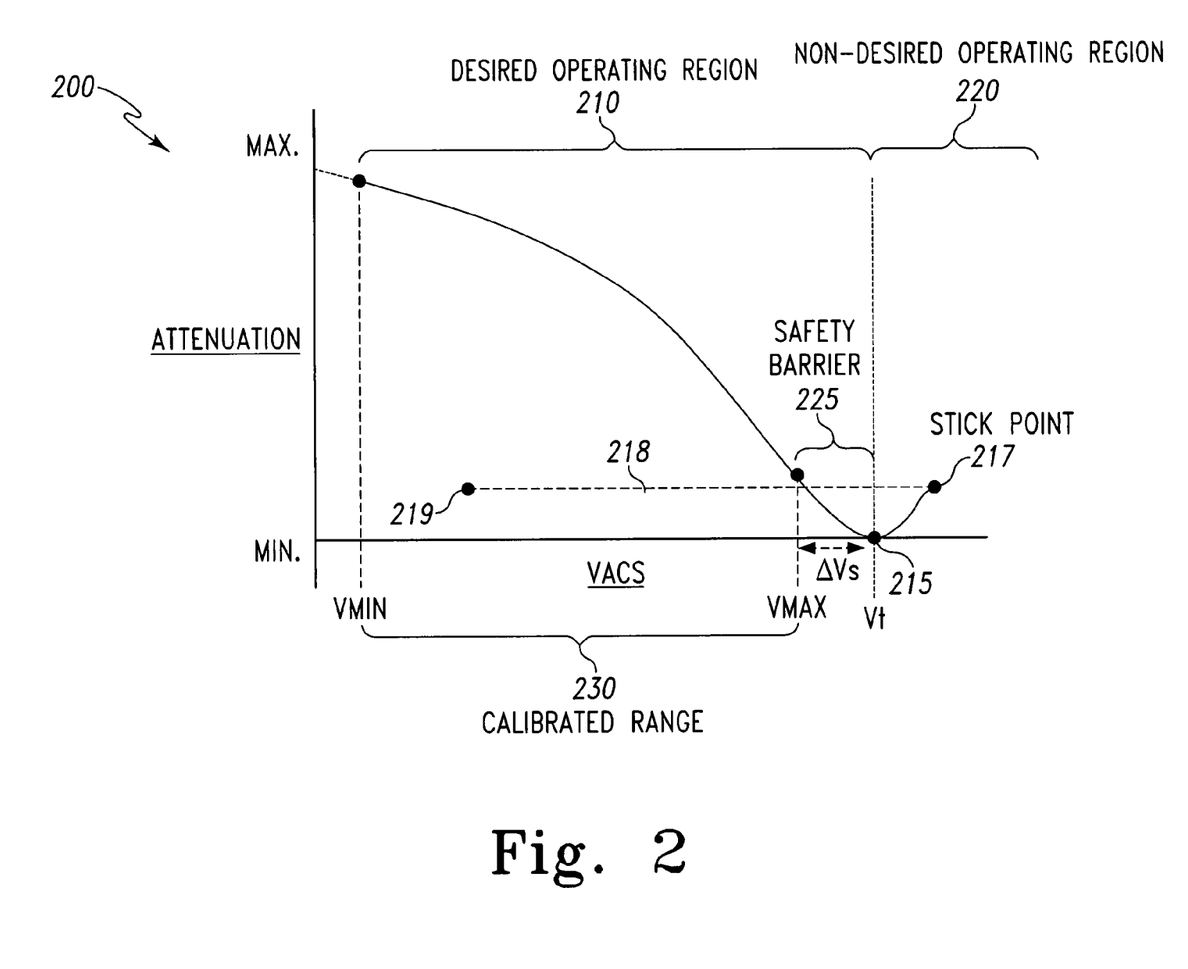
FIG. 2 is a diagram illustrating a characteristic curve for an optical power attenuator of one embodiment of the present invention.

The relationship between the power attenuation provided by an optical power attenuator and the attenuation control signal applied to the optical power attenuator is generally described by a characteristic curve, such as that shown in FIG. 2. FIG. 2 illustrates one characteristic curve 200 of an optical power attenuator of one embodiment of the present invention, such as optical power attenuator 150. Characteristic curve 200 correlates the magnitude of a voltage applied as feedback to optical power attenuator 150 (Vacs) against the optical power attenuation provided by optical power attenuator 150.

Although characteristic curve 200 illustrates a correlation where optical power attenuation decreases as the magnitude of the attenuation control signal increases, optical power attenuators having characteristic curves where optical power attenuation decreases as the magnitude of the attenuation control signal decreases are also contemplated and within the scope of embodiments of the present invention. Additionally, although FIG. 2 illustrates a characteristic curve in terms of attenuation as a function of voltage, other characteristic curves for variable power attenuators that vary attenuation based on other signal characteristics are also contemplated by embodiments of the present invention. For example, in alternate embodiments, variable power attenuators may vary attenuation based on a current or frequency characteristic of the attenuation control signal.

Characteristic curve 200 comprises two regions which may be described as a desired operating region (shown as region 210) and a non-desired operating region (shown as region 220). Transition point 215 marks the boundary between regions 210 and 220. Desired operating region 210 includes that region of characteristic curve 200 where optical power attenuator 150 provides a predictable and desirable response to changes in the attenuation control signal from controller 160. Within desired operating region 210, as Vacs decreases, the attenuation optical power by optical power attenuator 150 increases. Conversely, as Vacs increases, the attenuation optical power by optical power attenuator 150 decreases. For the embodiment illustrated by characteristic curve 200, as Vacs increases, the attenuation provided by optical power attenuator 150 approaches a minimum attenuation which occurs when Vacs reaches voltage Vt at transition point 215.

When controller 160 drives Vacs beyond Vt, optical power attenuator 150 will no longer operate in the manner desired for controlling attenuation. This is because any further increase in Vacs would result in an increase in the attenuation provided by optical power attenuator 150 rather than the expected decrease. The resulting reduction in optical power to optical receiver 130 can lead to a loss of the communications link between communications network segments 110 and 140. For example, when network 100 is degraded and optical power levels have fallen well outside of the target power ranges, controller 160 would expect that increasing Vacs would increase the optical power of the signal received by optical receiver 130, and thus stabilize the communication link. However, when Vacs is already at Vt, an increase in Vacs (i.e., entry into non-desired operating region 220) would actually cause an increase in the attenuation of the signal, thus likely destroying the already fragile communications link.

Driving the attenuation control signal into the non-desired operating region 220 can also result in a phenomenon know as "sticking." When sticking occurs, the affected optical power attenuator no longer responds to changes in the attenuation control signal as described by its characteristic curve, but instead "sticks" at some constant attenuation level (as illustrated by dashed line 218 in FIG. 2). The exact point where sticking occurs (illustrated generally by stick point 217) varies from one optical power attenuator to another, and may drift for any one optical power attenuator over time or as a function of environmental factors such as temperature. In one embodiment, sticking point 217 coincides with transition point 215 where Vacs is Vt.

In some embodiments, once sticking occurs, an optical power attenuator will only become "unstuck" (that is, return to faithfully following its characteristic curve) when the attenuation control signal drops below an "unsticking" point 219. As describe above, if controller 160 is driving the Vacs at or near Vt, it is likely because network 100 is degraded and optical power levels have fallen well outside of the target power ranges. Thus, dropping Vacs down to "unsticking" point 219 in order to regain control of optical power attenuator 150 would cause optical power attenuator 150 to suddenly increase attenuation as the "sticking" releases, thus likely destroying the communications link due to resulting drop in optical power.

Thus, operation outside of desired operating region 210 is undesirable for at least two reasons: 1) the attenuation control signal may reach a point where sticking occurs, and 2) beyond the transition point, changes in the attenuation control signal may result in an increase in attenuation just when network operating condition require increased optical power levels to maintain communications link stability.

In one embodiment of the present invention, to avoid operation of optical power attenuator 150 outside of desired operating region 210, controller 160 is calibrated to establish a safety buffer (illustrated by region 225) between a calibrated region 230 of characteristic curve 200 and non-desired operating region 220. In one embodiment an upper voltage limit (shown as Vmax) is established at some voltage ΔVs less than Vt to define one endpoint of calibrated region 230. In one embodiment, Vmax is determined during a calibration of network 100 to determine where Vt occurs as described in the '724 Application herein incorporated by reference. ΔVs is a value chosen by network operators based on their experience with optical power oscillations and transients within their network. In one embodiment, where optical power attenuator 150 is designed to respond to an attenuation control signal having a voltage range of 11-20 volts, a ΔVs of approximately 0.4 volts would be an expected value. As described in the '724 Application, in one embodiment an attenuation control signal that correlates with a maximum signal attenuation point defines the second endpoint (Vmin) of calibrated region 230. In one embodiment, Vmin is determined by the lowest Vacs voltage that D/A converter 180 can generate.

Constraining the attenuation control signal to calibrated range 230 provides a high degree of assurance that controller 160 will always operate optical power attenuator 150 within desired operating region 210. The cost of this assurance is paid in terms of the optical budget surrendered by not driving the attenuation control signal into safety barrier region 225.

Embodiments of the present invention enable operators to regain all or part of the additional attenuation available from safety barrier region 225 when additional power is required to maintain the stability of a communications link.

In one embodiment, during normal network operation, Vacs will remain within calibrated range 230 and will not approach the proximity of transition point 215 unless optical power in network 100 begins to fall outside of the target power range. When an attenuation adjustment is required, controller 160 drives the attenuation control signal to any point within calibrated range 230 to achieve the desired optical power level at optical receiver 130. For example, suppose in one embodiment, optical receiver 130 operates with an optical power window having a maximum supported power level of −11 dBm and a minimum supported power level of −27 dBm, and network operators optimally desire to operate network 100 at a power level of −17 dBm. When an attenuation adjustment is required to maintain a −17 dBm optical power level, controller 160 will drive Vacs anywhere within calibrated range 230, up to an including Vmax, to achieve −17 dBm. Thus, controller 160 constrains the attenuation control signal to calibrated range 230 to ensure that optical power attenuator 150 is operated within desired operating region 210.

In some instances, optical power level may degrade to a point where controller 160 is unable to restore optical power to the desired optical power level by generating an attenuation control signal within calibrated range 230. Because the desired optical power level is typically greater than optical receiver 130's minimum supported power level, operation of network 100 at less than the desired optical power level will not necessarily negatively impact the communications link as long as the optical signal received by optical receiver 130 is at least equal to the minimum supported power level. In such conditions, controller 160 will drive Vacs up to Vmax in order to attempt to increase the optical power of the optical signal received by optical receiver 130 as much as possible, while still constraining Vmax to within the calibrated range of the characteristic curve. When optical power continues to fall even when controller 160 drives Vacs to Vmax, controller 160 continues to constrain Vacs to Vmax as long as the signal received by optical receiver 130 is greater than or equal to optical receiver 130's minimum supported power level.

When the optical power of the optical signal received by optical receiver 130 falls below optical receiver 130's minimum supported power level, the risk of losing the communications link significantly increases. Under such circumstances, the utility of gaining a few dBm of optical budget by driving the attenuation control signal beyond the calibrated range becomes worth the risk of potentially reaching transition point 215 or sticking point 217, because the risk associated with staying within calibrated range 230 has increased. For example, because stick point 217 may drift due to ageing or as a function of temperature, controller 160 does not have precise knowledge of where stick point 217 will occur. If sticking occurs and causes a sudden increase in optical power attenuation, the risk of losing the communications link is significant. However, when the optical power of the signal received by optical receiver 130 is at or near the minimum supported power level, network 100 is already at risk of losing the communications link. Therefore, the risk of sticking is outweighed by the potential of obtaining one or more dBm of optical budget and increasing the optical power received by optical receiver 130.

Although low optical power levels are a good proxy for estimating the risk of losing a communications link, embodiments of the present invention further provide additional means for determining whether it is worth the risk of driving the attenuation control signal beyond the calibrated range. In one embodiment, controller 160 determines whether to drive the attenuation control signal beyond the calibrated range based on the bit error rate of the optical signal received by optical receiver 130. If optical power levels are at or near the minimum supported power level, but the bit error rate of the optical signal is less than a pre-determined maximum error rate, then the communications link is stable and the risk of driving the attenuation control signal beyond the calibrated range is less justifiable. In contrast, when optical power levels are at or near the minimum supported power level and the bit error rate of the optical signal is greater than the pre-determined maximum error rate, then there is a significant likelihood that the communications link will fail if optical power is not increased. In this situation, the utility of gaining optical budget by driving the attenuation control signal beyond the calibrated range becomes worth the risk of potentially reaching transition point 215 or sticking point 217. In one embodiment, when the bit error rate continues to increase, controller 160 drives the attenuation control signal further into safety barrier region 225 to attempt to stabilize the communications link. The maximum error rate for a particular implementation of network 100 is a provisional threshold that can be readily chosen by one of ordinary skill in the art. In one embodiment, the maximum error threshold is a function of the transport standard implemented by network 100. For example, in one embodiment, where network 100 implements a TDMA standard transport, the maximum error threshold may be established as a bit error rate of $10^{-10}$.

In one embodiment, a controller transmits one or more alarms to network operators to alert them about adverse network conditions. In one embodiment, the controller sends an alarm when the attenuation control signal reaches an edge of the calibrated range of an optical power attenuator (e.g., when Vacs reaches Vmax). In one embodiment, the controller sends an alarm when the optical power received by the optical receiver is less than or equal to the minimum supported power level. In one embodiment, the controller sends an alarm when the optical signal received by the optical receiver has a bit error rate greater than the pre-defined maximum error threshold.

In one embodiment, controller 160 recalibrates calibration region 230 based on knowledge gained while operating in safety barrier region 225. In one embodiment, when controller 160 successfully drives the attenuation control signal beyond the calibrated range without reaching either transition point 215 or stick point 217, controller 160 redefines the calibrated range based on the last attenuation control signal. For example, in one embodiment, controller 160 recalibrates Vmax based on the maximum Vacs achieved in safety barrier region 225. In one embodiment, when controller 160 drives the attenuation control signal beyond the calibrated range and reaches either transition point 215 or stick point 217, controller 160 redefines the calibrated range based on the last attenuation control signal prior to reaching transition point 215 or stick point 217, respectively.

Figure 3:
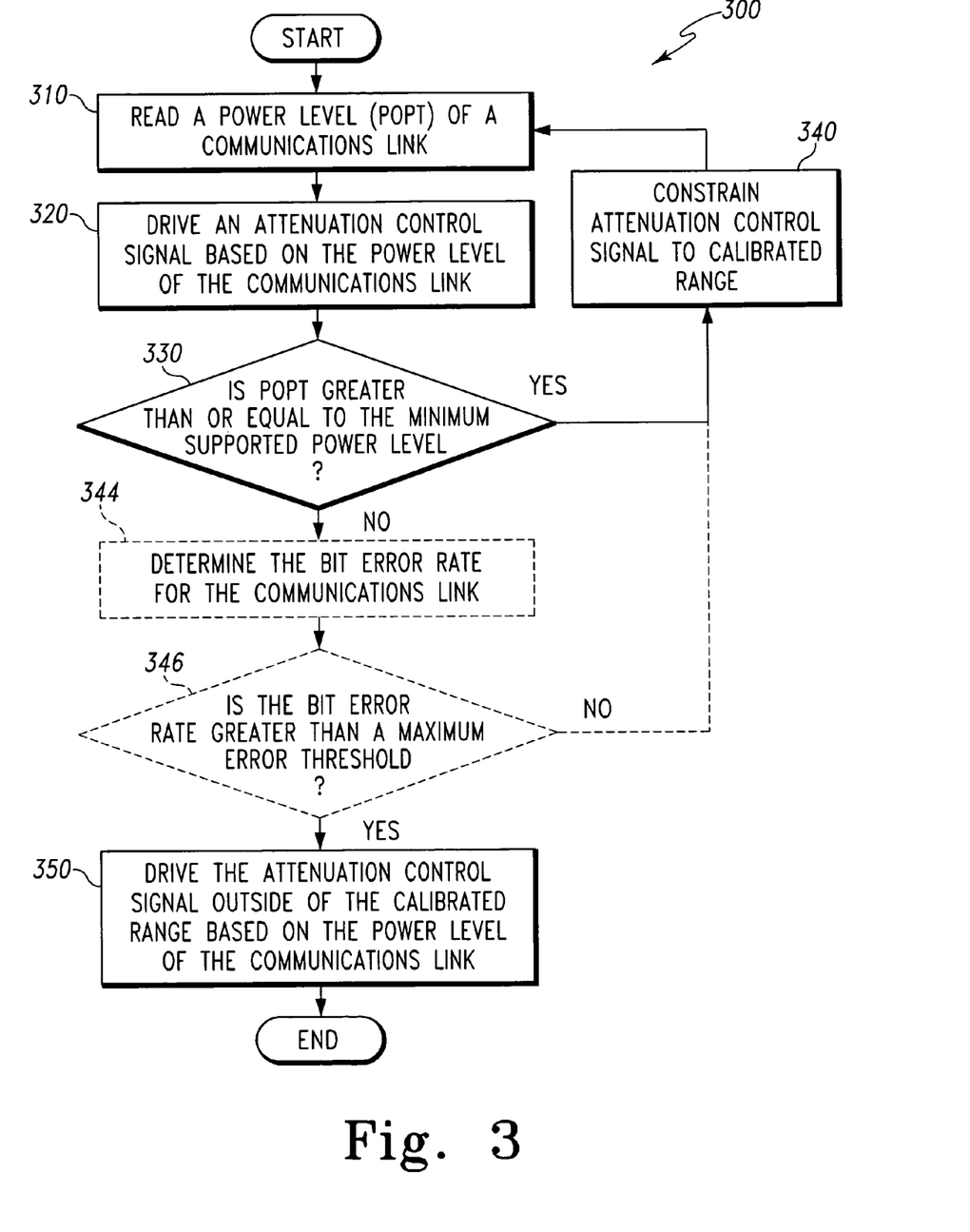
FIG. 3 is a flow chart illustrating a method of one embodiment of the present invention.

FIG. 3 illustrates a method for communications network power control of one embodiment of the present invention. In one embodiment, the method is implemented by a network such as network 100 of FIG. 1. In other embodiments, other networks implement the method. The method begins at 310 with reading a power level (Popt) of a communications link. In one embodiment, reading a power level includes measuring an optical power level of an optical data signal. In one embodiment, Popt is read from an optical power level signal supplied by an optical receiver that measures optical power levels. In that case, the optical receiver measures the optical power level of an optical signal it receives and outputs the measurement as an optical power signal. In other embodiments, other power level measuring devices are employed to determine Popt.

The method proceeds to 320 with driving an attenuation control signal based on the power level of the communications link. In one embodiment, driving the attenuation control signal includes adjusting the attenuation control signal in order to maintain Popt at a pre-defined target power level. In one embodiment, the attenuation control signal is adjusted depending on whether Popt lies within a power target range having a lower power target setpoint (Pt_low) and an upper power target setpoint (Pt_hi). If so, no adjustment of the attenuation control signal is required. Pt_low and Pt_hi power target setpoints define the target power range for normal network operation that envelopes a target optical power level (Pt) determined by network operators. For example, in one embodiment where the window of operation for an optical receiver is defined by a maximum supported power level (such as −11 dBm, for example) and a minimum supported power level (such as −27 dBm, for example) and network operators have chosen a Pt of −17 dBm, then a Pt_low of −6.5 dBm and a Pt_high of −17.5 dBm are typical setpoints defining the target power range. In one embodiment, when Popt does not fall within the target power range, then a target attenuation control signal (Vtarget) is calculated as a function of Popt. In one embodiment, Vtarget represents the attenuation control signal theoretically required to drive the optical power attenuator to achieve an optical power level of within the target power range. Additional details regarding systems and methods for calculating Vtarget are provided in the '724 Application herein incorporated by reference.

As long as the Popt is greater than or equal to a minimum supported power level (checked at 330), the method constrains the attenuation control signal to a calibrated range of a characteristic curve (340). As discussed above with respect to FIG. 2, the characteristic curve depicts the degree of attenuation expected from a variable power attenuator (such as optical power attenuator 150, for example) as a function of the attenuation control signal level applied to the variable power attenuator. In one embodiment, the calibrated range of a characteristic curve is defined as those voltage levels between a minimum calibrated voltage (Vmin) and a maximum calibrated voltage (Vmax), inclusive. Vmax and Vmin are calibrated to respective points on the characteristic curve such that any sticking point that may exist lies outside of the calibrated range. In one embodiment, Vmax and Vmin are also calibrated to points on the characteristic curve such that any transition point on the characteristic curve also lies outside of the calibrated range.

When Popt is less than the minimum supported power level (checked at 330), the method proceeds to 350 with driving the attenuation control signal outside of the calibrated range based on the power level of the communications link. When Popt falls below the minimum supported power level, the risk of losing the communications link significantly increases. Under such circumstances, the utility of gaining a few dBm of optical budget by driving the attenuation control signal beyond the calibrated range becomes worth the risks of potentially reaching a transition point or a sticking point that exists outside of the calibrated range.

In one embodiment, prior to driving the attenuation control signal outside of the calibrated range at 350, the method optionally determines the bit error rate for the communications link at 344. When the bit error rate is greater than a maximum error threshold (checked at 346), the method continues to 350 with driving the attenuation control signal outside of the calibrated range based on the power level of the communications link. The risk of sticking or reaching a transition point while driving the attenuation control signal outside of the calibrated range is outweighed by the potential of obtaining one or more dBm of optical budget and increasing the optical power of the optical signal enough to stabilize the communications link. However, when the bit error rate is less than the maximum error threshold, the risk is not outweighed so the method constrains the attenuation control signal to the calibrated range of a characteristic curve (340).

Several means are available to implement the controller of the current invention. These means include, but are not limited to, digital computer systems, programmable controllers, or field programmable gate arrays. Therefore other embodiments of the present invention include program instructions resident on computer readable media that when implemented by such controllers, enable the controllers to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for controlling power in a communications network, the method comprising:
    reading a power level of a communication link;
    driving an attenuation control signal that adjusts an optical power attenuator based on the power level of the communication link;
    determining a bit error rate of the communication link;
    when the power level is greater than or equal to a minimum supported power level, driving an attenuation control signal further comprises constraining the attenuation control signal to a calibrated range of a characteristic curve; and
    when the power level is less than the minimum supported power level and the bit error rate is greater than a maximum error threshold, driving an attenuation control signal further comprises generating an attenuation control signal outside the calibrated range of the characteristic curve.

2. The method of claim 1, wherein reading a power level of a communication link further comprises:
    measuring an optical power of an optical signal received by an optical receiver.

3. The method of claim 2, wherein when the optical power measurement is outside a target power range, driving the attenuation control signal based on the power level of the communication link further comprises:
    calculating a target voltage necessary to maintain the optical power measurements at a target power level; and
    adjusting the attenuation control signal based on the target voltage.

4. The method of claim 1, farther comprising:
    measuring a bit error rate of an optical signal received by an optical receiver.

5. The method of claim 1 further comprising one or more of:

generating an alarm when the attenuation control signal is equal to a maximum calibrated value of the calibrated range of the characteristic curve;
generating an alarm when the power level of the communication link is less than the minimum supported power level; and
generating an alarm when the bit error rate exceeds the maximum error threshold.

6. The method of claim 1, farther comprising:
adjusting the power level of the communication link based on the attenuation control signal.

7. The method of claim 1, wherein when driving an attenuation control signal farther comprises generating an attenuation control signal outside the calibrated range of the characteristic curve, the method farther comprises:
recalibrating the calibrated range based on the attenuation control signal generated outside the calibrated range of the characteristic curve.

8. A computer-readable medium having computer-executable program instructions for a method for controlling power in a communications network, the method comprising:
reading a power level of a communication link;
generating an attenuation control signal based on the power level of the communication link;
determining a bit error rate of the communication link;
when the power level is greater than or equal to a minimum supported power level, driving an attenuation control signal further comprises constraining the attenuation control signal to a calibrated range of a characteristic curve; and
when the power level is less than the minimum supported power level and the bit error rate is greater than a maximum error threshold, generating an attenuation control signal further comprises generating an attenuation control signal outside the calibrated range of the characteristic curve.

9. The computer-readable medium of claim 8, wherein reading a power level of a communication link further comprises:
measuring an optical power of an optical signal received by an optical receiver.

10. The computer-readable medium of claim 9, wherein when the optical power measurement is outside a target power range, generating an attenuation control signal based on the power level of the communication link further comprises:
calculating a target voltage necessary to maintain the optical power measurements at a target power level; and
adjusting the attenuation control signal based on the target voltage.

11. The computer-readable medium of claim 8 further comprising one or more of:
generating an alarm when the attenuation control signal is equal to a maximum calibrated value of the calibrated range of the characteristic curve;
generating an alarm when the power level of the communication link is less than the minimum supported power level; and
generating an alarm when the bit error rate exceeds the maximum error threshold.

12. The computer-readable medium of claim 8 further comprising:
adjusting the optical power level of the communication link based on the attenuation control signal.

13. The computer-readable medium of claim 8 further comprising:
measuring a bit error rate of the communication link.

14. The computer-readable medium of claim 8, wherein when generating an attenuation control signal further comprises generating an attenuation control signal outside the calibrated range of the characteristic curve, the method further comprises:
recalibrating the calibrated range based on the attenuation control signal generated outside the calibrated range of the characteristic curve.

15. A system for controlling optical power levels, the system comprising:
an optical receiver that receives a modulated optical light signal, demodulates the modulated optical light signal into one or more communications signals, and outputs the one or more communications signals to a communications network;
at least one optical power attenuator that dynamically adjusts the attenuation of the modulated optical light signal based on an attenuation control signal;
a controller coupled to the at least one optical power attenuator, wherein the controller is adapted to receive a signal representing the optical power of the modulated optical light signal from the optical receiver and to output the attenuation control signal;
wherein when the optical power of the modulated optical light signal is greater than or equal to a minimum supported power level, the controller is adapted to constrain the attenuation control signal to a calibrated range of a characteristic curve; and
when the optical power of the modulated optical light signal is less than the minimum supported power level and a measured bit error rate is greater than a maximum error threshold, the controller is adapted to generate an attenuation control signal outside the calibrated range of the characteristic curve.

16. The system of claim 15, wherein the optical receiver is adapted to measure the optical power of the modulated optical light signal and output the signal representing the optical power to the controller.

17. The system of claim 16, wherein when the optical power measurement is outside a target power range, the controller generates the attenuation control signal based on:
calculating a target voltage necessary to maintain the optical power measurements at a target power level; and
adjusting the attenuation control signal based on the target voltage.

18. The system of claim 15, wherein the controller is further adapted to generate an alarm when one or more of the attenuation control signal is equal to a maximum calibrated value of the calibrated range of the characteristic curve; optical power of the modulated optical light signal is less than the minimum supported power level; and the bit error rate exceeds the maximum error threshold.

19. The system of claim 15, wherein the controller is further adapted to recalibrating the calibrated range based on an attenuation control signal generated outside the calibrated range of the characteristic curve.

20. A system for controlling power in a communications network, the system comprising:
means for measuring a power level of a modulated optical signal;
means for generating an attenuation control signal based on the power level of the modulated optical signal, the means for generating an attenuation control signal responsive to the means for measuring the power level of the modulated optical signal;

means for determining a bit error rate of the communication link;
means for constraining the attenuation control signal to a calibrated range of a characteristic curve when the power level is greater than or equal to a minimum supported power level; and
wherein, the means for generating an attenuation control signal is further adapted to generate an attenuation control signal outside the calibrated range of the characteristic curve when of the power level is less than the minimum supported power level and the bit error rate is greater than a maximum error threshold.

21. The system of claim 20 further comprising:
means for attenuating the power level of the modulated optical signal, the means for attenuating the power level responsive to the means for generating the attenuation control signal.

22. The system of claim 20, wherein the means for generating an attenuation control is further adapted to recalibrate the calibrated range based on an attenuation control signal generated outside the calibrated range of the characteristic curve.

* * * * *